(12) United States Patent
Lässig et al.

(10) Patent No.: US 7,973,915 B2
(45) Date of Patent: Jul. 5, 2011

(54) METHOD AND APPARATUS FOR INVERTING A FLEXIBLE MOLDING

(75) Inventors: Günter Lässig, Obernburg (DE); Roger Biel, Aschaffenburg (DE)

(73) Assignee: Novartis AG, Basel (CH)

( * ) Notice: Subject to any disclaimer, the term of this patent is extended or adjusted under 35 U.S.C. 154(b) by 200 days.

(21) Appl. No.: 12/378,608

(22) Filed: Feb. 18, 2009

(65) Prior Publication Data

US 2009/0219517 A1    Sep. 3, 2009

(30) Foreign Application Priority Data

Feb. 20, 2008    (EP) .................................... 08101778

(51) Int. Cl.
*G01N 21/11*    (2006.01)
(52) U.S. Cl. ......... 356/124; 414/755; 414/405; 198/380
(58) Field of Classification Search .......... 356/124–127; 264/1.1, 2.6; 53/431, 247; 425/808; 414/755, 414/816, 405; 198/380
See application file for complete search history.

(56) References Cited

U.S. PATENT DOCUMENTS

| 5,561,970 | A |  | 10/1996 | Edie et al. ........................ 53/473 |
| 5,641,437 | A |  | 6/1997 | Williams et al. ................ 264/2.5 |
| 6,558,584 | B1 | * | 5/2003 | O'Neill et al. ................. 264/1.1 |
| 6,909,503 | B2 |  | 6/2005 | Baske et al. .................... 356/246 |
| 2002/0185758 | A1 |  | 12/2002 | Gilliard ......................... 264/1.32 |

FOREIGN PATENT DOCUMENTS

WO    WO 2007/091124    8/2007

OTHER PUBLICATIONS

PCT International Search Report.
PCT Written Opinion of the International Searching Authority.

* cited by examiner

*Primary Examiner* — Hoa Q Pham
(74) *Attorney, Agent, or Firm* — Sheng-Hsin Hu

(57) ABSTRACT

A method for providing a flexible molding, in particular an ophthalmic lens such as a contact lens, in a predetermined orientation, comprises the steps of
determining the actual orientation of the molding, and
in case the molding has been determined as not having the predetermined orientation, inverting the flexible molding to the predetermined orientation.

9 Claims, 4 Drawing Sheets

METHOD AND APPARATUS FOR INVERTING A FLEXIBLE MOLDING

Figure 1:
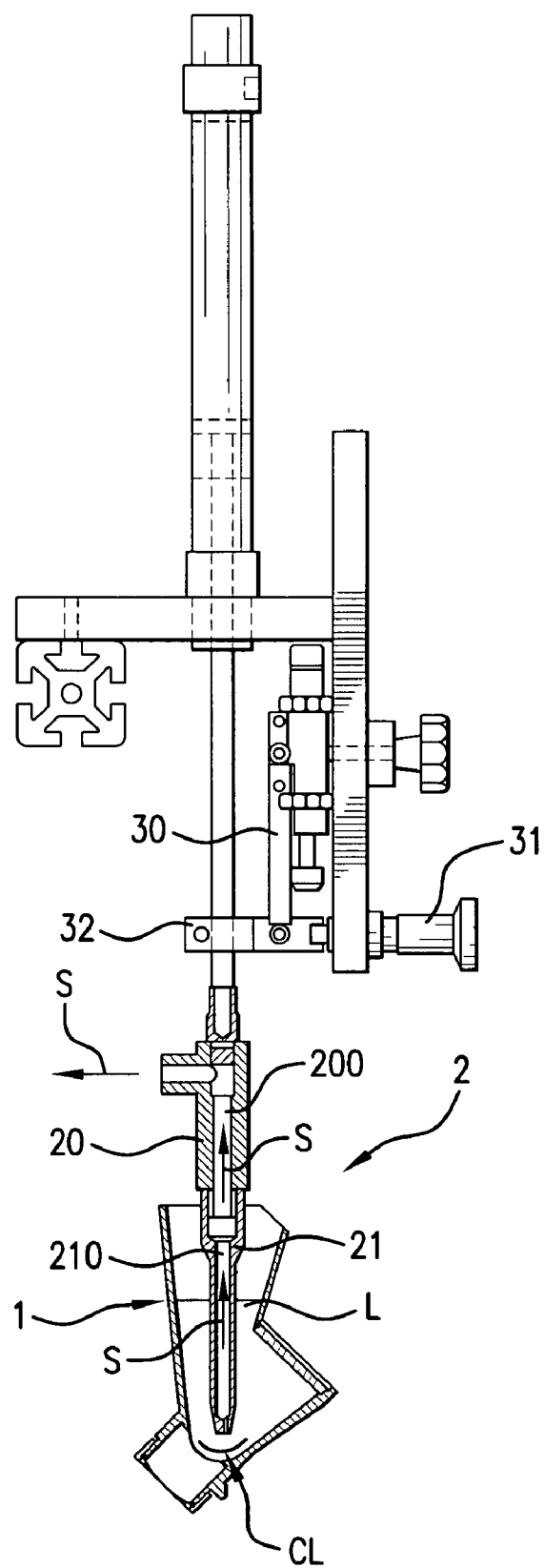

This application claims benefit under 35 USC §119 of European patent application European patent application 08101778.2 filed 20 Feb. 2008, the contents of which are incorporated herein by reference in its entirety.

The present invention relates to a method and to an apparatus for inverting a flexible molding, in particular an ophthalmic lens such as a contact lens, as it is defined in the respective independent claim.

In mass production of flexible contact lenses, for example of single wear contact lenses, it is known that a molded contact lens can be removed from the respective mold half to which it adheres with the aid of a tweezers gripper, such as it is shown, for example, in WO 2006/119993. However, it may occur that the lens is inverted during its removal.

The contact lens removed from the mold half may then be inserted into an inspection cuvette which is filled with liquid, as this is disclosed, for example, in WO 03/016855 or in WO 2007/042880. The cuvette is capable of being swivelled from an insertion/removal position in which the lens is inserted into the cuvette, to an inspection position in which the lens is inspected, and back to the insertion/removal position in which the lens is removed from the cuvette after inspection.

As has already been mentioned above, in certain instances the contact lens may not have its proper orientation (that is, the contact lens may be turned inside out) in which it is to be placed into the package later in the process. While inversion of a contact lens may occur for various reasons during production (only by way of example one reason has been explained above), proper orientation of the lens in the package should be made sure since a user taking the contact lens out of the package should take out a contact lens having its proper (predetermined) orientation so as to be able to place the contact lens onto the eye without the need to invert the lens prior to placing it on the eye.

Accordingly, it is an object of the invention to provide a method and an apparatus that make sure that the contact lenses are always placed into the package having their proper orientation.

This object is achieved by a method and an apparatus according to the instant invention, as these are characterized in the respective independent claim. Advantageous variants of the method or embodiments of the apparatus result from the features of the dependent claims.

In particular, the method for providing a flexible molding, in particular an ophthalmic lens such as a contact lens, in a predetermined orientation, comprises the steps of
  determining the actual orientation of the molding
  in case the molding has been determined as not having the predetermined orientation, inverting the flexible molding to the predetermined orientation.

Determination of the actual orientation can be performed, for example, using a well-known image analysis method. Such an image analysis method is capable of determining whether the actual orientation of the contact lens is proper or whether the contact lens must be inverted so as to have the proper (predetermined) orientation. In case the contact lens already has its proper orientation, the lens does not have to be inverted. However, in case the lens does not have its proper orientation, the lens is inverted and then, after inversion, has its proper orientation.

In one variant of the method according to the invention, the flexible molding is a contact lens that is provided in a container containing a liquid, and the step of inverting the contact lens comprises the steps of inserting an elongated member into the liquid to a position such that the distal end of the elongated member is arranged close to the contact lens, and
applying suction through the elongated member.

The container can be a cuvette as it is disclosed in the already mentioned WO 03/016855 or WO 2007/042280. The elongated member is then inserted into the liquid contained in the cuvette such that the distal end of the elongated member is close to the contact lens, and suction is then applied. Depending on which embodiment of the elongated member is used, the following variants of the method can be used.

In one variant the elongated member used comprises an attachment surface having a diameter that is substantially smaller than the diameter of the contact lens. The attachment surface has holes therein through which suction is applied. In this variant, inverting the contact lens comprises the steps of
  applying suction through the holes of the attachment surface so as to make the contact lens adhere to the attachment surface,
  rapidly moving the elongated member within the liquid in the container with the contact lens adhered to the attachment surface so as to cause the contact lens to be inverted through inversion of those portions of the contact lens extending outwardly beyond the attachment surface, and
  after completion of the rapid movement of the elongated member, releasing the suction through the holes of the attachment surface so as to allow release of the inverted contact lens from the attachment surface.

Inversion of the contact lens occurs in this variant of the method similar to an umbrella that is flipped inside out in a storm. Since the diameter of the attachment surface of the elongated member is substantially smaller than the diameter of the contact lens, once the contact lens adheres to the attachment surface there are portions of the contact lens that extend outwardly beyond the attachment surface. Due to the rapid movement of the elongated member in the liquid with the contact lens adhered to the attachment surface, the outwardly extending portions of the contact lens are inverted resulting in an inversion of the contact lens. After inversion of the contact lens, the suction is released thus releasing the contact lens from the attachment surface and allowing it to settle down in the liquid contained in the container, which may be the aforedescribed cuvette.

In another variant of the method according to the invention the elongated member used comprises a distal end having a hollow cylindrical portion with an inner diameter which is smaller than the diameter of the contact lens not having the proper (predetermined) orientation but which is slightly larger than the diameter of the contact lens having the proper (predetermined) orientation. The hollow cylindrical portion is terminated at its proximal end by a concave attachment surface, and the attachment surface has holes therein. In this variant, the step of inverting the contact lens comprises the steps of
  applying suction through the holes of the concave attachment surface so as to suck the contact lens against the distal end of the cylindrical portion and cause the contact lens to be inverted thus allowing the inverted contact lens to enter the cylindrical portion and to adhere to the concave attachment surface,
  releasing the suction so as to release the inverted contact lens from the attachment surface and to allow the inverted contact lens to settle down in the liquid contained in the container.

A contact lens not having the proper (predetermined) orientation has a diameter which is larger than the diameter of the contact lens when having its proper (predetermined) orientation. In accordance with this variant of the method, when the contact lens has an improper orientation, the diameter of the contact lens is too large for the contact lens to enter the hollow cylindrical portion of the elongated member. However, the contact lens abuts against the end faces of the hollow cylindrical portion at the distal end of the elongated member. Due to the suction applied through the holes in the attachment surface, the suction forces acting on the contact lens cause the lens to be inverted whereupon the diameter of the lens becomes smaller since the lens changes its orientation from the improper orientation to the proper orientation. Once the lens has been inverted the diameter of the lens is such that it may enter the hollow cylindrical portion and adheres to the concave attachment surface terminating the hollow cylindrical portion at the proximal end of the said portion. Suction is then released so as to release the contact lens from the concave attachment surface and to allow the contact lens to settle down in the liquid contained in the container, which may be the afore-described cuvette.

In still another variant of the method according to the invention the elongated member used comprises a longitudinally extending channel having a conically shaped inlet opening at its distal end. In this variant of the method the step of inverting the contact lens comprises the steps of applying suction to the channel so as to suck the contact lens through the conically shaped inlet opening into the channel thereby inverting the contact lens, and after having sucked the contact lens into the channel applying overpressure to push the contact lens back into the liquid and to allow it to settle down in the liquid contained in the container.

This variant essentially makes use of the finding, that a flexible contact lens generally is capable of wrapping itself like a cigar so as to be able to enter the channel through the conically shaped inlet opening. However, this is only possible when the contact lens has the proper orientation. Due to the suction applied, there are forces acting on an improperly oriented lens until the lens is inverted. Thereafter, the contact lens is capable of wrapping itself like a cigar so as to be able to enter the channel. Once the lens has been sucked into the channel, overpressure is applied to push the lens back into the liquid, so that the lens is allowed to settle down in the liquid contained in the container, as this has been described above. The container may once more be the afore-described cuvette.

As regards the apparatus according to the invention, the apparatus for providing a flexible molding, in particular an ophthalmic lens such as a contact lens, in a predetermined orientation, comprises in particular means for determining the orientation of the molding, and means for inverting the flexible molding to the predetermined orientation in case the molding has been determined as not having the proper predetermined orientation.

Essentially, the following embodiments of the apparatus correspond to the respective variants of the method described above and, therefore, the way how the corresponding embodiments of the apparatus work are not reiterated here.

In one embodiment of the apparatus according to the invention, the flexible molding is a contact lens and the means for inverting the contact lens comprise an elongated member having a distal end and having at least one channel through which suction can be applied to the distal end of the elongated member, and means for applying suction through the channel to the distal end of the elongated member.

In another embodiment of the apparatus according to the invention, the elongated member comprises an attachment surface having a diameter that is substantially smaller than the diameter of the contact lens and having holes therein through which suction is applied, and means for rapidly moving the elongated member after application of suction through the holes provided in the attachment surface.

In a specific embodiment of this apparatus the means for rapidly moving the elongated member comprise a pretensioned spring. As the pretensioned spring is released, the rapid movement is performed with the lens being adhered to the attachment surface, so that those portions of the contact lens which extend outwardly beyond the attachment surface are inverted, thus resulting in an inversion of the contact lens, as this has been described above.

In another embodiment of the apparatus according to the invention the elongated member comprises a distal end having a hollow cylindrical portion with an inner diameter which is smaller than the diameter of the contact lens not having the predetermined orientation but which is slightly larger than the diameter of the contact lens having the predetermined orientation, a concave attachment surface arranged to terminate the hollow cylindrical portion at its proximal end, the attachment surface having holes therein, and means for applying suction through the holes of the concave attachment surface.

In still another embodiment of the apparatus according to the invention, the elongated member comprises a longitudinally extending channel having a conically shaped inlet opening at its distal end, means for applying suction to the channel so as to suck the contact lens through the conically shaped inlet opening into the channel thereby inverting the contact lens, and means for applying overpressure to the channel upon having sucked the contact lens into the channel.

Figure 2:
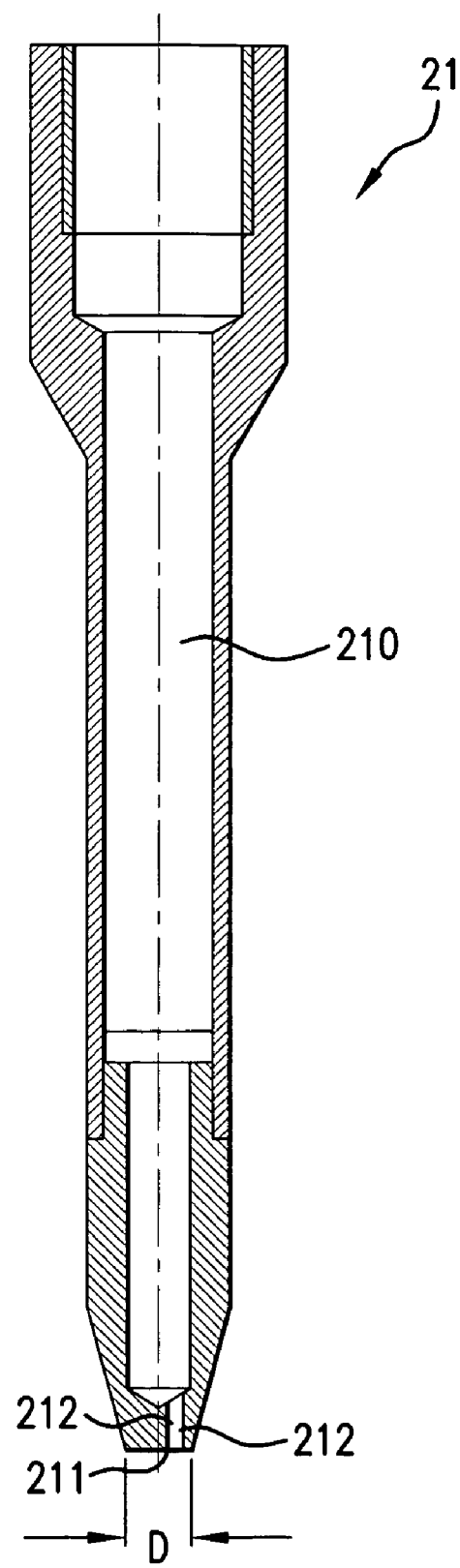
Figure 3:
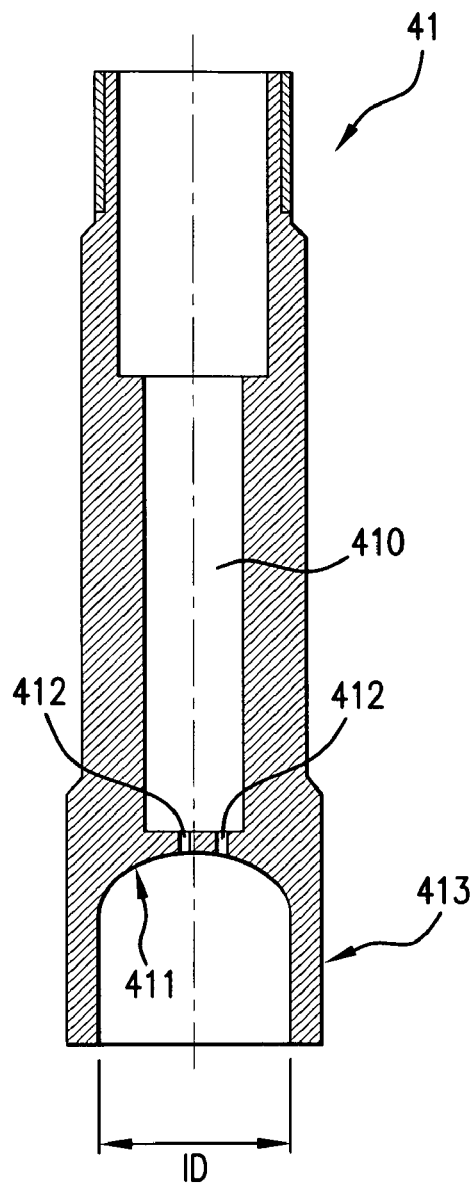
Figure 4:
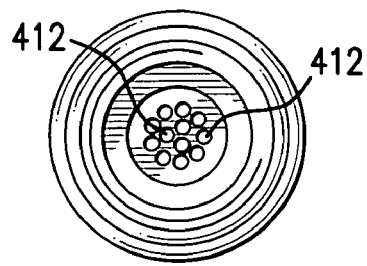
Figure 5:
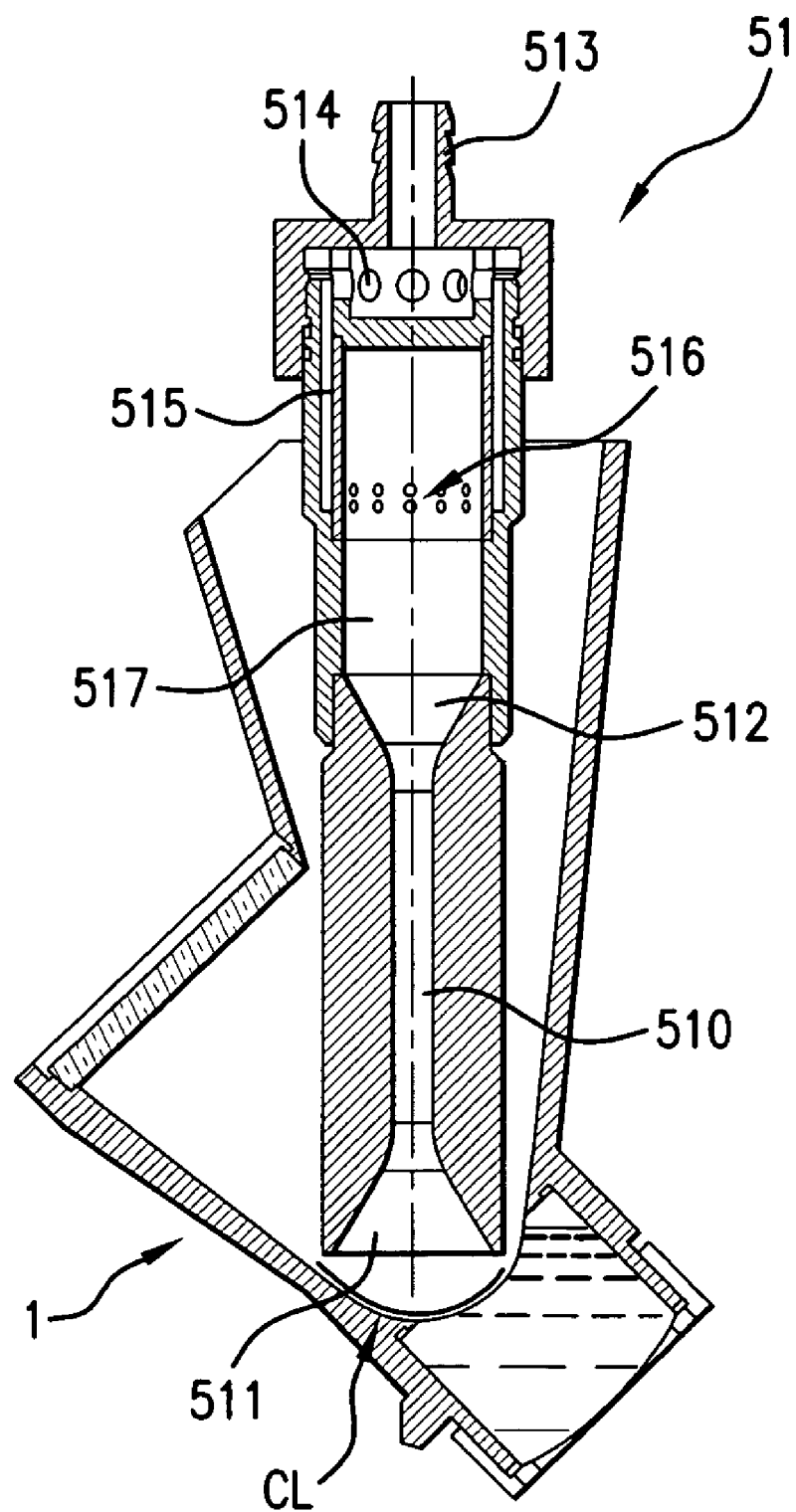

Further advantageous aspects of the method and apparatus according to the invention will become apparent from the following description of embodiments of the invention with the aid of the drawings in which:

FIG. 1 an embodiment of an apparatus according to the invention capable of carrying out the method according to the invention, FIG. 2 a longitudinal section of a first embodiment of a suction member which is part of the elongated member of the apparatus according to the invention, FIG. 3 a longitudinal section of a second embodiment of a suction member which is part of the elongated member of the apparatus according to the invention, FIG. 4 a bottom view of the embodiment of the suction member shown in FIG. 3, and FIG. 5 a longitudinal section of a third embodiment of the suction member which is part of the elongated member of the apparatus according to the invention.

FIG. 1 shows a first embodiment of the apparatus according to the invention. The flexible molding is a contact lens CL which is contained in a container embodied as a cuvette 1. Cuvette 1 may be a cuvette as it is described in WO 03/016855 or in WO 2007/042280, and is filled with liquid L, for example water. Let us assume, that contact lens CL does not have its proper orientation in which it is to be placed in the eye. This can be determined, for example, through image analysis which can be performed when contact lens CL is contained in cuvette 1. Such image analysis is conventional and need not be described in more detail.

As can be seen from FIG. 1, this embodiment of the apparatus according to the invention comprises an elongated member 2 which itself comprises adapter 20 having a hollow channel 200 and elongated tube 21. Adapter 20 can be attached to a suction source (not shown). Tube 21 comprises channel 210 leading to an attachment surface provided at the distal end of tube 21, with holes being provided in the attachment surface. Suction can be applied through channel 200 of the adapter, through channel 210 of tube 21, and through the holes provided in the attachment surface of tube 21. As suction is applied like this is indicated by arrows S in FIG. 1, contact lens CL is sucked against the attachment surface of tube 21.

Tube 21 is shown in an enlarged view in FIG. 2. It can be seen there that tube 21 may be attached to adapter 20 by means of an inner thread provided at the proximal end of tube 21. At the distal end of tube 21 there is attachment surface 211 which is provided with holes 212 therein. For example, three such holes 212 may be provided in attachment surface 211 which are evenly distributed when viewed in the circumferential direction (that is to say there is one hole 212 every 120°).

The diameter D of attachment surface 211 is substantially smaller than the diameter of contact lens CL. As a consequence, once suction S is applied contact lens CL is sucked against attachment surface 211 and adheres to attachment surface 211 with its central portion, however, the peripheral portions of contact lens CL extend outwardly beyond attachment surface 211. In accordance with this embodiment, elongated member 2 is now rapidly moved upwards in the liquid L. The rapid movement of elongated member 2 in the liquid L with contact lens CL adhered to attachment surface 211 causes the portions of the contact lens extending outwardly beyond attachment surface 211 to flip (similar to an umbrella in a storm) thus inverting the contact lens CL to its proper (predetermined) orientation. This can be performed, for example, with the aid of a pretensioned spring 30, as this is shown in FIG. 1, which can be released by pulling locking pin 31 (in FIG. 1 to the right) out of a locking groove provided in a clamp 32 which is clamped to a shaft that is rigidly attached to adapter 20 of elongated member 2. Thus, releasing pretensioned spring 30 rapidly raises elongated member 2 with the contact lens CL adhered to attachment surface 211 which causes inversion of contact lens CL as this has been described above.

Once the rapid movement has been completed and contact lens CL has been inverted accordingly, suction S is released and since suction is no longer applied through holes 212 in attachment surface 211 the inverted contact lens is then released from attachment surface 211 so that it may settle down in the liquid L contained in cuvette 1. The elongated member 2 can be moved upwardly out of cuvette 1, so that cuvette 1 can be transported to another station in the contact lens manufacturing process where the now properly oriented contact lens can be removed from cuvette 1 and be transferred to the packaging station, for example.

A second embodiment of an apparatus according to the invention is shown in FIG. 3 and comprises an elongated tube 41 having a channel 410. At its proximal end tube 41 is provided with an outer thread for attachment of tube 41 to a suitable adapter (similar to the adapter discussed with respect to the first embodiment, however, attachment is performed via the outer thread rather than via an inner thread). At its distal end, tube 41 is provided with a hollow cylindrical portion 413, which has a concave attachment surface 411 at its proximal end, which is provided with holes 412. Hollow cylindrical portion 413 has an inner diameter ID which is smaller than the diameter of the contact lens CL when it has an improper orientation. At the same time inner diameter ID is slightly larger than the diameter of the contact lens CL when it has its proper orientation. That is to say, as long as contact lens CL has its improper orientation it may not enter into hollow cylindrical portion 413 while it may enter into hollow cylindrical portion 413 when it is properly oriented.

The distribution of holes 412 in attachment surface 411 can be seen best in FIG. 4. Again, three holes are arranged in a central portion of attachment surface 411 evenly distributed (that is to say one hole 412 each 120° when viewed in circumferential direction), and additional nine holes are evenly arranged thereabout (one hole 412 each 40° when viewed in circumferential direction).

As suction is applied through channel 410 and through holes 412 provided in concave attachment surface 411, the improperly oriented contact lens is sucked towards concave attachment surface 411. However, due to the diameter of the contact lens which is too large to allow the improperly oriented contact lens CL to enter hollow cylindrical portion 413, contact lens abuts against the end faces at the distal end of hollow cylindrical portion 413. As a consequence of the continuing suction forces acting on the improperly oriented contact lens CL, however, the contact lens is inverted to its proper orientation. After inversion of the contact lens, inner diameter ID of hollow cylindrical portion 413 is slightly larger than the diameter of the contact lens now having its proper orientation. Accordingly, contact lens CL can now enter into hollow cylindrical portion 413 and is sucked towards concave attachment surface 411 to adhere to attachment surface 411. Suction is then released so as to release the inverted (properly oriented) contact lens from attachment surface 411 to allow the contact lens to settle down in the liquid L contained in cuvette 1.

A third embodiment of the apparatus according to the invention is shown in FIG. 5 and comprises an elongated tube 51 having a channel 510 with a conically shaped inlet opening 511 at its distal end. Conically shaped inlet opening 511 tapers towards channel 510. At the proximal end of channel 510, a further conically shaped portion 512 is provided also tapering towards channel 510. Tube 51 is provided at its proximal end with a connection port 513 to connect tube 51 to a suction source (not shown).

As suction is applied through connection port 513, through openings 514, through the annular space 515, through openings 516 and through channel 510, contact lens CL having its improper orientation is sucked into conically shaped opening 511 towards channel 510. While generally contact lens CL is capable of rolling itself like a cigar to enter channel 510, this is only possible when contact lens CL has its proper orientation. As long as contact lens CL is improperly oriented, however, it cannot enter channel 510. However, due to the continuing forces acting on contact lens CL while suction is applied contact lens CL is inverted to achieve its proper orientation and then rolls itself like a cigar as described above, enters channel 510 and is then sucked through channel 510 and through conically shaped portion 512 into space 517.

Suction is then released and overpressure is applied instead so as to push contact lens CL through conically shaped portion 512, through channel 510 and through conically shaped inlet opening 511 into the liquid L contained in cuvette 1 so as to allow the now properly oriented contact lens CL to settle down in the liquid. The following steps during manufacturing can be the same steps as already mentioned further above.

Various modifications and changes are conceivable without departing from the general concept underlying the instant invention. Accordingly, although the present invention has been described with the aid of specific embodiments it is not intended to limit the scope of protection to the embodiments described, but rather the scope of protection is defined by the appended claims.

The invention claimed is:

1. Method for providing a contact lens, in a predetermined orientation, comprising the steps of
   determining the actual orientation of the contact lens, and
   in case the contact lens has been determined as not having the predetermined orientation, inverting the flexible contact lens to the predetermined orientation,
wherein the contact lens is provided in a container containing a liquid, wherein step of inverting the contact lens comprises the steps of:
   inserting an elongated member into the liquid to a position such that the distal end of the elongated member is arranged close to the contact lens, and
   applying suction through the elongated member wherein the contact lens is provided in a container containing a liquid, wherein step of inverting the contact lens comprises the steps of
      inserting an elongated member into the liquid to a position such that the distal end of the elongated member is arranged close to the contact lens, and
      applying suction through the elongated member.

2. Method according to claim 1, wherein the elongated member comprises an attachment surface having a diameter that is substantially smaller than the diameter of the contact lens and having holes therein through which suction is applied, wherein the step of inverting the contact lens comprises the steps of
   applying suction through the holes of the attachment surface so as to make the contact lens adhere to the attachment surface,
   rapidly moving the elongated member within the liquid in the container with the contact lens adhered to the attachment surface so as to cause the contact lens to be inverted through inversion of those portions of the contact lens extending outwardly beyond the attachment surface, and
   after completion of the rapid movement of the elongated member, releasing the suction through the holes of the attachment surface so as to allow release of the inverted contact lens from the attachment surface.

3. Method according to claim 1, wherein the elongated member comprises a distal end having a hollow cylindrical portion with an inner diameter which is smaller than the diameter of the contact lens not having the predetermined orientation but which is slightly larger than the diameter of the contact lens having the predetermined orientation, and in which the hollow cylindrical portion is terminated at its proximal end by a concave attachment surface, the attachment surface having holes therein, wherein the step of inverting the contact lens comprises the steps of
   applying suction through the holes of the concave attachment surface so as to suck the contact lens against the distal end of the cylindrical portion and cause the contact lens to be inverted thus allowing the inverted contact lens to enter the cylindrical portion and to adhere to the concave attachment surface,
   releasing the suction so as to release the inverted contact lens from the attachment surface and to allow the inverted contact lens to settle down in the liquid contained in the container.

4. Method according to claim 1, wherein the elongated member comprises a longitudinally extending channel having a conically shaped inlet opening at its distal end, wherein the step of inverting the contact lens comprises the steps of
   applying suction to the channel so as to suck the contact lens through the conically shaped inlet opening into the channel thereby inverting the contact lens, and
   after having sucked the contact lens into the channel applying overpressure to push the contact lens back into the liquid and to allow it to settle down in the liquid contained in the container.

5. Apparatus for providing a contact lens, in a predetermined orientation, comprising
   means for determining the actual orientation of the contact lens, and
   means for inverting the contact lens to the predetermined orientation in case the contact lens has been determined as not having the predetermined orientation,
wherein the means for inverting the contact lens comprise,
   an elongated member having a distal end and having at least one channel through which suction can be applied to the distal end of the elongated member, and
   means for applying suction through the channel to the distal end of the elongated member.

6. Apparatus according to claim 5, wherein the elongated member comprises
   an attachment surface having a diameter that is substantially smaller than the diameter of the contact lens and having holes therein through which suction is applied,
   means for rapidly moving the elongated member after application of suction through the holes provided in the attachment surface.

7. Apparatus according to claim 6, wherein the means for rapidly moving the elongated member comprise a pretensioned spring.

8. Apparatus according to claim 7, wherein the elongated member comprises
   a longitudinally extending channel having a conically shaped inlet opening at its distal end,
   means for applying suction to the channel so as to suck the contact lens through the conically shaped inlet opening into the channel thereby inverting the contact lens, and
   means for applying overpressure to the channel upon having sucked the contact lens into the channel.

9. Apparatus according to claim 5, wherein the elongated member comprises
   a distal end having a hollow cylindrical portion with an inner diameter which is smaller than the diameter of the contact lens not having the predetermined orientation but which is slightly larger than the diameter of the contact lens having the predetermined orientation,
   a concave attachment surface arranged to terminate the hollow cylindrical portion at its proximal end, the attachment surface having holes therein,
   means for applying suction through the holes of the concave attachment surface.

* * * * *